(No Model.)

F. G. FREESE.
DRIVING GEAR FOR STREET CARS.

No. 318,717. Patented May 26, 1885.

WITNESSES:
T. F. Holden.
M. F. Hallech

INVENTOR,
Frank G. Freese
By S. J. Van Stavoren
ATTORNEY

UNITED STATES PATENT OFFICE.

FRANK G. FREESE, OF PHILADELPHIA, PENNSYLVANIA.

DRIVING-GEAR FOR STREET-CARS.

SPECIFICATION forming part of Letters Patent No. 318,717, dated May 26, 1885.

Application filed February 17, 1885. (No model.)

*To all whom it may concern:*

Be it known that I, FRANK G. FREESE, a citizen of the United States, residing at Philadelphia, in the county of Philadelphia and State of Pennsylvania, have invented certain new and useful Improvements in Motor or Engine Devices and Driving-Gear for Street and other Cars, of which the following is a specification, reference being had therein to the accompanying drawings, wherein—

Figure 1:
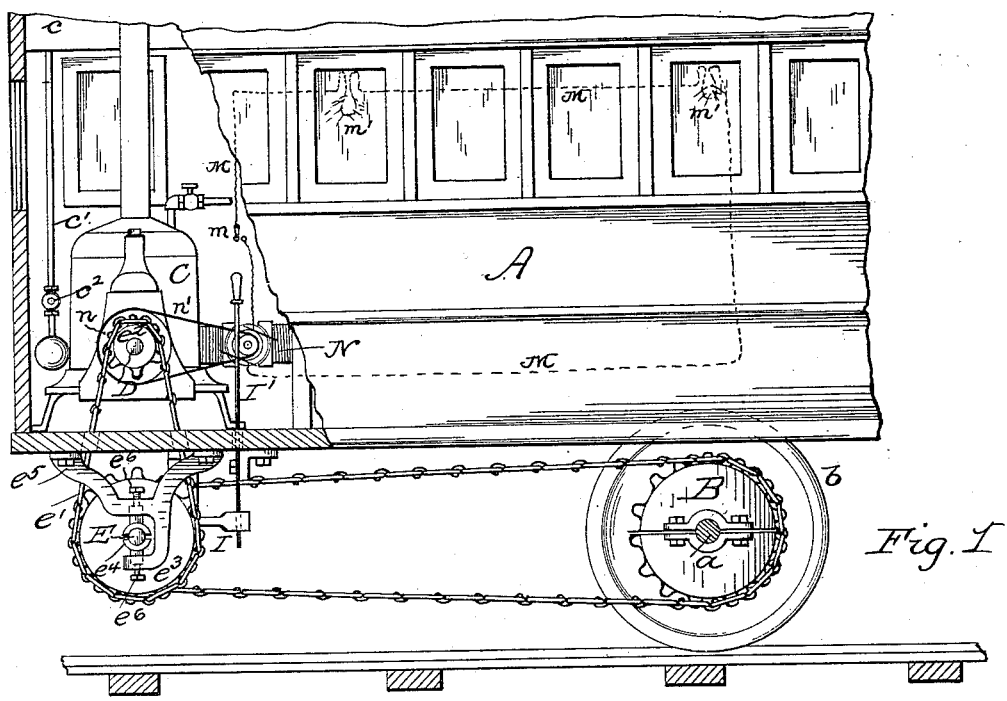
Figure 2:
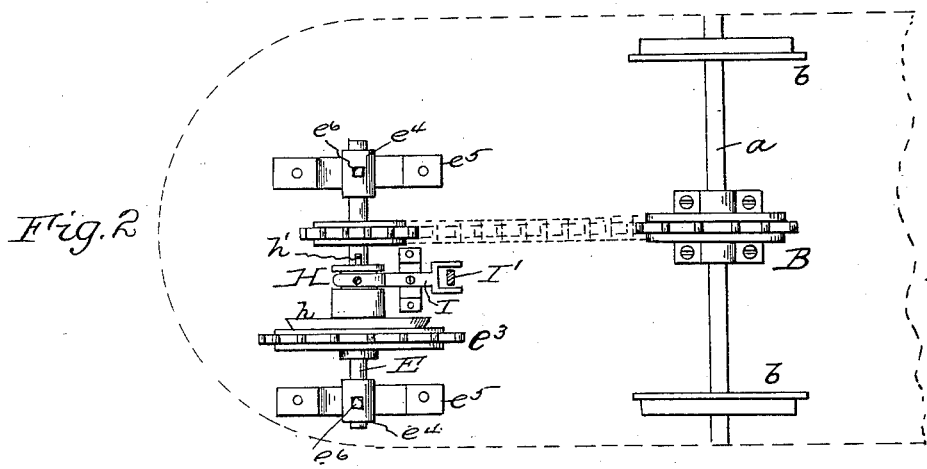

Figure 1 is a broken elevation of a car, partly in section, showing motor or engine and driving-gear embodying my improvements, and Fig. 2 is a plan of the driving-gear and of the clutch mechanism for controlling the movements of the same and of the car.

My invention has relation to power motor devices for street, tramway, or other cars, whether traveling on surface or elevated roads; and it has for its object to provide a comparatively inexpensive form of car-motor or engine and driving-gear which is so arranged and furnished with a clutch mechanism that the power of the motor is more effectively and economically utilized to start a car, and its stopping and starting during travel is more easily, quickly, and, to the passengers, pleasantly accomplished than has heretofore been done.

My invention accordingly consists of the combination, construction, and arrangement of parts, as hereinafter described and claimed, having reference particularly, first, to a car having a steam or other motor or engine, driving-gear between it and one of the axles of the car, and a clutch mechanism for controlling the movement of said driving-gear, whereby the driving-shaft of the engine is adapted to run continuously during the travel of the car, and its stopping and starting are controlled or effected by manipulating said clutch mechanism; second, to a car having a steam or other motor or engine, a counter-shaft provided with a loose wheel, clutch mechanism and a fixed wheel, and chain or like gearing connecting the driving-shaft of the engine with said counter-shaft and the latter with one of the axles of the car; and, third, to a car-motor having a continuously-running driving-shaft in gear with a dynamo-electric generator which is in circuit with electric-lighting devices.

In the drawings, A represents a portion of a car, and $a$ one of its axles, which car may be of any of the well-known form of street, tramway, dummy-engine, railroad, or other car, as desired, for either surface or elevated railways.

To axle $a$ is firmly secured a sprocket or other wheel, B, having suitable peripheral teeth or projections adapted to receive a drive-chain or like gearing. This wheel is preferably made in two sections or split, as shown, to permit it to be securely clamped or affixed to the axle $a$ without removing the car-wheels $b$.

In the forward or other suitable part of the car is placed a steam or other engine or motor, C, preferably one in which oil is used for fuel, in which case the supply or oil tank $c$ can be conveniently secured to the roof of the car or otherwise and have a pipe-connection, $c'$, with the valve $c^2$, leading to the furnace of the engine C, as shown. The driving-shaft D of the engine, or the latter itself, will be provided with any of the well-known appliances for reversing the direction of rotation of said driving-shaft in order to provide for the forward and backward travel or movement of the car. Said driving-shaft is placed in gear with a counter-shaft, E, by means of drive-chain $e'$ and sprocket or other wheels $e^2$ and $e^3$, respectively mounted upon shafts D and E. The counter-shaft E is located at any suitable place below and secured to the bottom or floor of the car by, and has its bearings $e^4$ in, hangers $e^5$. The latter are provided with suitable set-screws, $e^6$, for adjusting the bearings $e^4$ to give the necessary tension to the drive-chain $e'$, connecting shafts D and E. The wheel $e^3$ is loosely mounted on counter-shaft E, so that said wheel revolves independently of said shaft, and it preferably forms part of a clutch mechanism, H, as more plainly shown in Fig. 2, being held in position on one side by a collar on said shaft, and on the other by a disk or sleeve, $h$, sliding longitudinally on said shaft and caused to revolve therewith by a spline or feather, $h'$. The disk or sleeve $h$ is moved into and out of engagement with wheel $e^3$ by any suitable form of levers or other operating mechanism, I and I', which may be secured in position as shown or otherwise, as desired, as I do not limit my invention to any particular form of clutch and its operating mechanism for the counter-shaft E or wheel $e^3$. Any of the well-known friction or other clutches may be used. The clutch-lever I' is preferably located within handy reach of the engineer or attendant.

The operation is obvious. The wheel $e^3$ being loose on counter-shaft E, the engine driving-shaft D can be rotated continuously at any desired speed during the entire trip of the car, and, such being the case, the car is stopped and started by simply manipulating the clutch mechanism H or its lever I'. The continuous revolution of the engine driving-shaft maintains its velocity and permits its power to be instantly, effectively, and economically applied by moving the clutch H to start the car when stopped, and with my improvements this movement is more easily and quickly effected than can be done by the manipulation of the engine throttle-valve, as has heretofore been practiced.

While I have shown and described the use of drive-chains for connecting the engine, counter, and axle shafts for the car, yet I do not confine myself thereto, as any other suitable connecting-gearing may be substituted.

N represents a dynamo-electric generator, whose armature is driven by a belt-connection, $n'$, from a pulley or fly wheel, $n$, on shaft D, and is in the circuit M of the lamps $m'$, said circuit having an electrical switch, $m$, for cutting the lights out of or placing them in circuit with the dynamo.

The engine shaft D being adapted to run independently of the driving mechanism, or continuously irrespective of the car being in motion or not, the dynamo can be always operated to keep up the supply of current for the lamps during the entire travel of the car, and also when it stops either during its trip or at the depot.

While I have shown and described the electric-lighting devices in connection with the motor and driving-gear for the car, yet I do not herein claim the lighting devices in themselves, as I reserve the same for the subject of a separate application.

What I claim is—

1. The combination, in a car, of a motor or engine shaft, D, counter-shaft E, having loose wheel $e^3$ and clutch mechanism H, and gearing interposed between wheel $e^3$ and engine-shaft D, and between shaft E and one of the axles of the car, substantially as shown and described.

2. The combination, in a car, of a motor or engine, C, having oil-fuel-supply tank $c$ and driving-shaft D, counter-shaft E, having loose wheel $e^3$ and clutch mechanism H, and gearing between said driving and counter shafts, and between the latter and one of the axles of the car, substantially as shown and described.

3. A car provided with an adjustable counter-shaft, E, having loose wheel $e^3$, clutch mechanism H, and in gear with one of the car-axles, and a motor or engine located on said car, substantially as shown and described.

4. In a car, a continuously-rotating engine or motor driving-shaft having a fixed sprocket-wheel, a counter-shaft having a loose sprocket-wheel, a drive-chain connecting said wheels, a clutch mechanism for the sprocket-wheel on the counter-shaft, and gearing interposed between the latter and one of the axles of the car, substantially as shown and described.

In testimony whereof I affix my signature in presence of two witnesses.

FRANK G. FREESE.

Witnesses:
H. FREESE,
GEORGE E. GOLDBECK.